(12) United States Patent
Yang

(10) Patent No.: US 8,512,083 B2
(45) Date of Patent: Aug. 20, 2013

(54) APPARATUS FOR CONNECTING CONNECTION PARTS BETWEEN POWER APPARATUSES

(76) Inventor: Kyoung Ho Yang, Chungcheongnam-Do (KR)

( * ) Notice: Subject to any disclaimer, the term of this patent is extended or adjusted under 35 U.S.C. 154(b) by 125 days.

(21) Appl. No.: 13/264,363

(22) PCT Filed: Jan. 22, 2010

(86) PCT No.: PCT/KR2010/000439
§ 371 (c)(1),
(2), (4) Date: Oct. 13, 2011

(87) PCT Pub. No.: WO2010/131831
PCT Pub. Date: Nov. 18, 2010

(65) Prior Publication Data
US 2012/0094516 A1    Apr. 19, 2012

(30) Foreign Application Priority Data

May 11, 2009   (KR) .......................... 10-2009-0040924

(51) Int. Cl.
*H01R 4/10* (2006.01)
(52) U.S. Cl.
USPC .......................................................... 439/879
(58) Field of Classification Search
USPC ................................. 439/874, 877, 879, 882
See application file for complete search history.

(56) References Cited

U.S. PATENT DOCUMENTS 3,474,399 A * 10/1969 Teagno ......................... 439/879
3,659,254 A *  4/1972 Cartwright ................... 439/751

4,704,498 A * 11/1987 Gregorac ....................... 174/79

(Continued)

FOREIGN PATENT DOCUMENTS

JP    2001-045644    8/1999
JP    2006-073396    9/2006

(Continued)

OTHER PUBLICATIONS

International Search Report for PCT/KR2010/000439 mailed on Aug. 24, 2010.

*Primary Examiner* — James Harvey
(74) *Attorney, Agent, or Firm* — Christopher Paul Mitchell

(57) ABSTRACT

The present invention relates to an apparatus for connecting connection parts between power apparatuses. The apparatus of the present invention comprises: a cable constituted by a conductive wire, and an outer coating which covers the conductive wire; socket means having a first housing, and a conductive connection element which is arranged in the first housing and which has an insertion groove, wherein the socket means is installed in a power apparatus to form a connection part for electrically connecting the cable to the power apparatus; and plug means which has a conductive ring fitted to the conductive wire exposed by removing the outer coating from one end of the cable, and which is arranged at the cable and fitted to the first housing of the socket means such that the conductive ring is inserted into the insertion groove of the conductive connection element so as to electrically connect the cable to the power apparatus. The present invention provides an apparatus for connecting connection parts between power apparatuses which interconnects power apparatuses through a cable plug-in connection method to accomplish remarkable effects in the aspects of economical advantages, safety, and ease of maintenance and recovery from failure, etc.

38 Claims, 7 Drawing Sheets

(56) References Cited

U.S. PATENT DOCUMENTS

| | | | |
|---|---|---|---|
| 5,447,454 A * | 9/1995 | Inaba et al. | 439/709 |
| 5,496,968 A * | 3/1996 | Katoh et al. | 174/74 R |
| 5,749,756 A * | 5/1998 | Vockroth et al. | 439/879 |
| 6,109,984 A * | 8/2000 | Tsou | 439/888 |
| 6,334,798 B1 * | 1/2002 | Ushijima et al. | 439/879 |
| 7,374,466 B2 * | 5/2008 | Onuma et al. | 439/874 |
| 7,422,480 B1 * | 9/2008 | Musick et al. | 439/585 |
| 7,494,388 B2 * | 2/2009 | Kakuta | 439/879 |
| 2012/0094516 A1 * | 4/2012 | Yang | 439/162 |

FOREIGN PATENT DOCUMENTS

| | | |
|---|---|---|
| KR | 20-1996-015695 | 10/1994 |
| KR | 20-1998-0060346 | 3/1997 |
| KR | 20-0438004 | 11/2006 |

* cited by examiner

APPARATUS FOR CONNECTING CONNECTION PARTS BETWEEN POWER APPARATUSES

RELATED APPLICATIONS

This application is a 371 application of International Application No. PCT/KR2010/000439, filed Jan. 22, 2010, which in turn claims priority from Korean Patent Application No. 10-2009-0040924, filed May 11, 2009, each of which is incorporated herein by reference in its entirety.

TECHNICAL FIELD

The present invention relates to an apparatus for connecting connection parts between power apparatuses including railroads, power plants, substations, switches (circuit breakers), and transformers, and more particularly, to an apparatus for connecting connection parts between power apparatuses which interconnects power apparatuses through a cable plug-in connection method to accomplish remarkable effects in the aspects of economical advantages, safety, and ease of maintenance and recovery from failure, etc.

BACKGROUND ART

A conventional connection method for power apparatuses including railroads, power plants, substations, switches (circuit breakers) and transformers have many problems in the aspects of economical efficiency, safety, maintenance and recovery from failure, etc. Thus, there is an increasing need for development and introduction of connection technology which solves the foregoing problems.

For example, in a substation, a connection part between power apparatuses such as connection of a main transformer and a gas insulated switchgear (GIS) is exposed to a railroad. Thus, there exists a possibility of safety accident and a failure as a result of contact by small animals (magpie, cat, mouse, etc.)

Recently, a part of a connection area is connected by a gas insulated bus (GIB) to remove the foregoing exposed area. However, this is expensive, difficult in maintenance and is limited in utilization of space.

Connection between the GIS and a transmission line and between a main transformer and a cable employs a conventional EB-G (SF6 gas immersed sealing end) type and EB-O (Oil immersed sealing end) type, which uses expensive connection materials and are difficult in connection operation and maintenance.

DISCLOSURE

Technical Problem

The present invention has been made to solve the problems and it is an object of the present invention to provide an apparatus for connecting connection parts between power apparatuses which interconnects power apparatuses by a cable plug-in connection method to accomplish remarkable effects in the aspects of economical advantages, safety, and ease of maintenance and recovery from failure, etc.

Technical Solution

In order to achieve the object of the present invention, an apparatus for connecting connection parts between power apparatuses comprises a cable which is constituted by a conductive wire, and an outer coating which covers the conductive wire; socket means which comprises a first housing, and a conductive connection element which is arranged in the first housing and which has an insertion groove, wherein the socket means is installed in a power apparatus to form a connection part for electrically connecting the cable to the power apparatus; and plug means which has a conductive ring fitted to the conductive wire exposed by removing the outer coating from one end of the cable, and which is arranged at the cable and fitted to the first housing of the socket means such that the conductive ring is inserted into the insertion groove of the conductive connection element so as to electrically connect the cable to the power apparatus.

Advantageous Effect

As described above, an apparatus for connecting connection parts between power apparatuses according to the present invention is an air cooled type and may be assembled in the air.

The apparatus for connecting connection parts between power apparatuses comprises socket means which opens a connection area in the field and connected to an electric cable.

The apparatus for connecting connection parts between power apparatuses sharply reduces assembly time, has an installation length reduced by 50% and occupies a minimum installation space including in the building of a substation.

The apparatus for connecting connection parts between power apparatuses may be voluntarily installed in any direction including horizontal, vertical and inclined directions from top and bottom and both ends of a power apparatus.

The apparatus for connecting connection parts between power apparatuses may accomplish remarkable effects in the aspects of economical advantages, safety, ease of maintenance and recovery from failure, etc.

DESCRIPTION OF MAJOR REFERENCE NUMERALS

Figure 1:
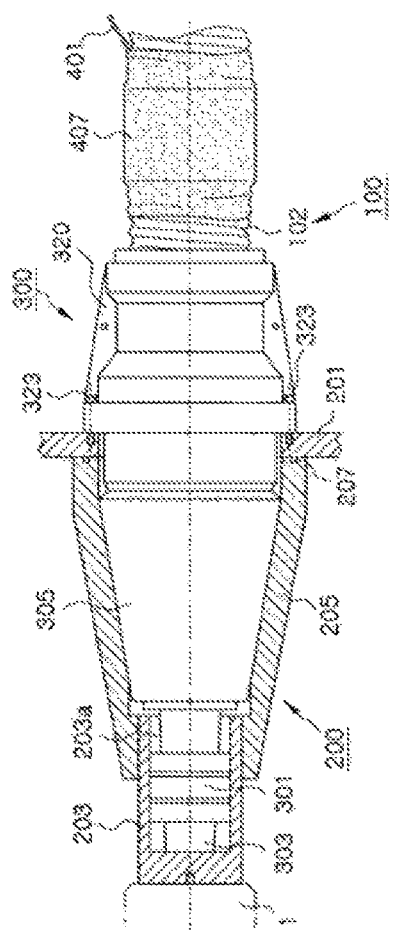
FIG. 1 illustrates an apparatus for connecting connection parts between power apparatuses according to the present invention.

1: power apparatus 100: cable
101: conductive wire 102: outer coating
111: insulating member 113: conductive wire screening member
115: screening member 123: shield member
127: semi-conductive member 151: wire screening member
153: first insulating tape 200: socket means
201: first housing 203: connection element
203a: insertion groove 205: bushing
207: first sealing member 300: plug means
301: conductive ring 303: tension member
305: wedge member 311: metal member
311a: fitting groove 317: varnish
320: second housing 321: flange
323: bolt screw 325: second sealing member 331: first metal film 333: first copper net
335: second insulating tape 361: second metal film
365: second copper net 401: ground line
405: fixer 407: covering member Best Mode The foregoing objective, advantages and other features will become more apparent with the following description by referring to accompanying drawings.

Hereinafter, an apparatus for connecting connection parts between power apparatuses according to the present invention will be described with reference to accompanying drawings. Throughout the drawings, the same elements will have the same reference numerals.

Figure 2:
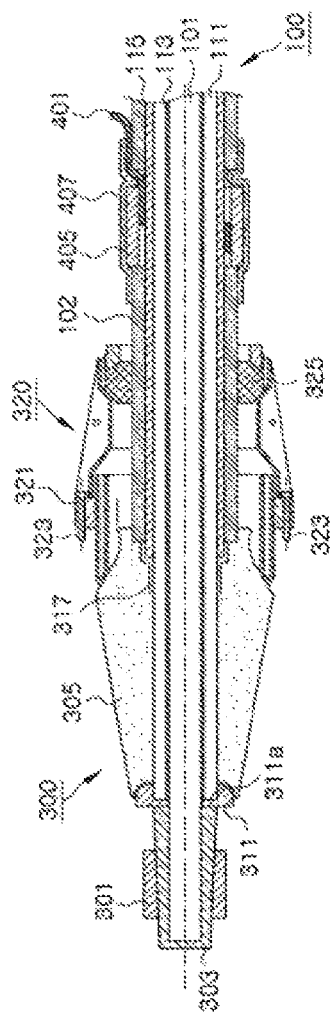
FIGS. 2 and 3 illustrate a cable and plug means according to the present invention.
Figure 3:
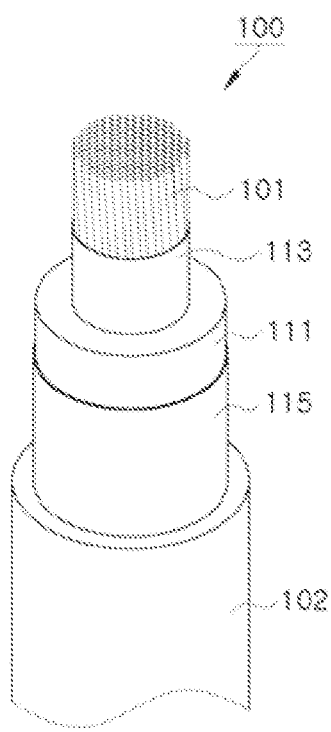
Figure 4:
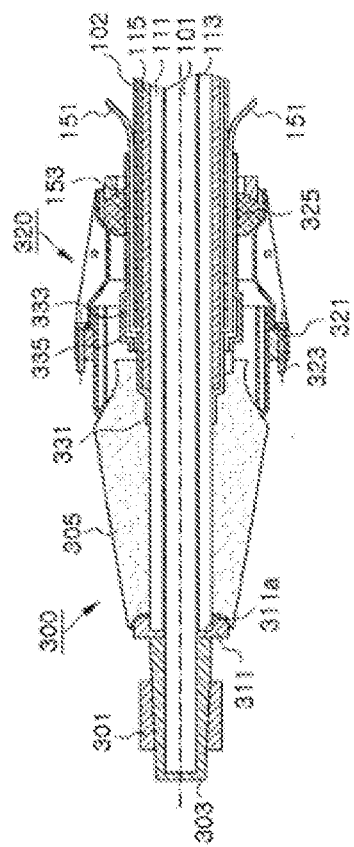
FIGS. 4 and 5 illustrate a variant of the cable and plug means according to the present invention.
Figure 5:
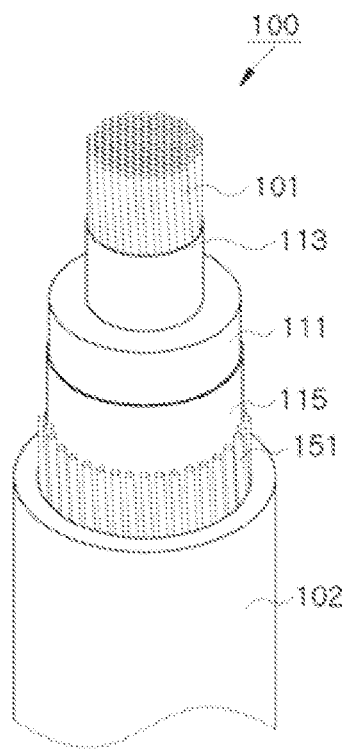
Figure 6:
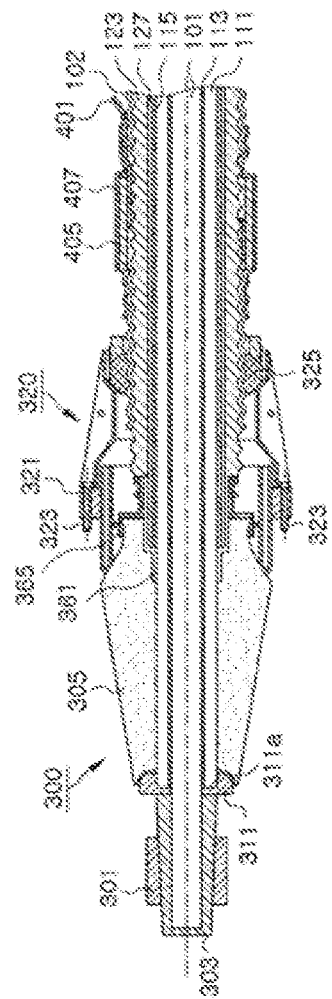
FIGS. 6 and 7 illustrate another variant of the cable and plug means according to the present invention.
Figure 7:
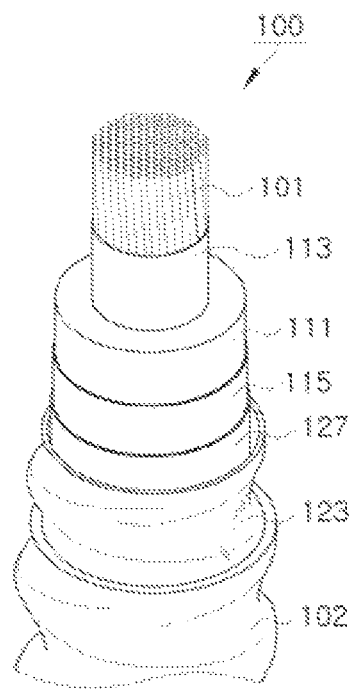

FIG. 1 illustrates an apparatus for connecting connection parts between power apparatuses according to the present invention. FIGS. 2 and 3 illustrate a cable and plug means according to the present invention. FIGS. 4 and 5 illustrate a variant of the cable and plug means according to the present invention. FIGS. 6 and 7 illustrate another variant of the cable and plug means according to the present invention.

As shown in FIG. 1, the apparatus for connecting connection parts between power apparatuses according to the present invention includes a cable 100, socket means 200 and plug means 300. The cable 100 electrically connects power apparatuses 1 in power plants, substations, switches (circuit breakers), transformers and railroads. The socket means 200 forms a connection part to electrically connect the cable 100 to the power apparatus 1. The plug means 300 is coupled to the socket means 200 and electrically connects the cable 100 to the power apparatus 1.

The cable 100 includes a conductive wire 101 which induces electricity and an outer coating 102 which covers the conductive wire 101.

The socket means 200 is built in the power apparatus 1 or is installed therein as a projection type. The socket means 200 includes a first housing 201 which has a space having at least one open surface therein; and a conductive connection element 203 which forms an insertion groove 204 in the first housing 201 to be electrically connected to the power apparatus 1.

A bushing 205 is installed in an inner wall of the first housing 201. The bushing 205 has a tapered shape, i.e., conical shape whose diameter becomes narrower toward the conductive connection element 203 so that the plug means 300 is fitted thereinto in a wedge shape. The bushing 205 is installed to surround the conductive connection element 203. The bushing 205 includes a synthetic resin insulating material as an air cooled type, and the conductive connection element 203 includes a highly conductive copper material.

A first sealing member 206 shaped like an O-ring is installed between the first housing 201 and the bushing 205 so that the socket means 200 has a watertight configuration, and a plurality of screw grooves (not shown) is formed in the opening surface of the first housing 201.

Further, the socket means 200 should maintain a rated insulating level or higher of the power apparatus 1. All of connection parts should be processed not to leak gas or receive outside air or leak oil. If the socket means 200 is connected to the cable 100 through the plug means 300, it should maintain a sufficient mechanical fixing force.

The socket means 200 may employ an IEC extension adaptor as necessary to extend a connection between the conductive connection element 203 and a bus bar terminal within the power apparatuses 1.

The socket means 200 may have a voltage tap mounted therein to detect a voltage.

The plug means 300 is installed in an end of the cable 100 and electrically connected to the socket means 200 to thereby connect the cable 100 to the power apparatus 1. That is, the plug means 300 has a conductive ring 301 fitted to the conductive wire 101 exposed by removing the outer coating 102 from one end of the cable 100, is arranged at the cable 100 and is fitted to the bushing 205 of the socket means 200 in a wedge shaped so that the conductive ring 301 is inserted into the insertion groove 204 of the conductive connection element 203 so as to electrically connect the cable 100 to the power apparatus 1.

The plug means 300 is firmly installed in the conductive wire 101 by fitting the conductive ring 301 to a conductive tension member 303 fitted to the conductive wire 101. The tension member 303 has a tapered shape, and has long grooves (not shown) formed in a lengthwise direction of the tension member 303 at a predetermined interval along a circumference having a larger diameter to provide a tension. If the conductive ring 301 is fitted to the tension member 303, the parts among the long grooves are elastically reduced to provide a tension to the conductive ring 301 so that the plug means 300 is firmly installed in the conductive wire 101.

The plug means 300 includes a wedge member 305 having the same conical shape as that of the bushing 205 and is installed in the socket members 200 in a wedge shape. The wedge member 305 is insulating and is fitted to the conductive wire 101 to the rear side of the tension member 303 and fitted to the bushing 205 in a wedge shape to shut down, i.e., seal the inside.

The wedge member 305 is formed to have an elasticity to provide a tension between the wedge member 305 and the bushing 205 to prevent the conductive ring 301 from being separated from the insertion groove 204 of the conductive connection element 203. The wedge member 305 includes a non-inflammable synthetic rubber material or non-inflammable insulating material to be insulating and elastic. As necessary, the wedge member 305 may be formed by stacking a plurality of layers including different insulating materials.

In the rear side of the wedge member 305, a second housing 320 is fitted to the cable 100 to be coupled to the first housing 201 of the socket means 200 and to fix the wedge member 305. The second housing 320 is coupled to the first housing 201 and fixes the wedge member 305 by connecting a plurality of bolt screws 323 installed in a flange 321 facing an opening surface of the first housing 201, to screw holes of the first housing 201.

The second housing 320 has a second sealing member 325 installed therein and having an O-ring shape and provides a water-tightness between the second housing 320 and the outer coating 102 of the cable 100.

With the foregoing configuration, the cable eases an electric field by forming various types of layer configurations between the conductive wire 101 and the outer coating 102, and extends such layer configuration to the plug means 300 to make the electric field in the plug means 300 flat to ease electric stress. As a result, a risk for an accident which may occur in a connection part formed by the plug means 300 is reduced sharply.

For example, as shown in FIGS. 2 and 3, the cable 100 includes an insulating member 111 which is covered between the conductive wire 101 and the outer coating 102. The insulating member 111 is formed by an extrusion molding of cross-linked polyethylene, and covers and insulates the conductive wire 101. The insulating member 111 covers and insulates the conductive wire 101 to have an end thereof protruding from the wedge member 305 to thereby ease the electric field formed in the plug means 300.

The plug means 300 includes a conductive metal member 311 which is fitted to the conductive wire 101 between the tension member 303 and the wedge member 305. The conductive metal member 311 pushes the wedge member 305 and prevents damage to the wedge member 305 due to a pusher tool when the wedge member 305 is fitted to the insulating member 111, and blocks a progress of the tension member 303 and prevents damage to the insulating member 111 and the wedge member 305. The conductive metal member 311 has a fitting groove 311a formed in a surface facing the insulating member 111 so that an end of the insulating member 111 protruding from the wedge member 305 is fitted to the fitting groove 311a.

The cable 100 includes a semi-conductive conductive wire screening member 113 which is covered between the insulating member 111 and the conductive wire 101. The conductive wire screening member 113 is formed by an extrusion molding of semi-conductive polyethylene, and covers the conductive wire 101 to thereby minimize an electric stress of the conductive wire 101 and ease an electric field formed in the cable 100 and the plug means 300. For example, the conductive wire screening member 113 minimizes the electric stress of the conductive wire 101 formed by twisting copper wires to thereby ease the electric field formed in the cable 100 and the plug means 300.

The cable 100 includes a semi-conductive screening member 115 which is covered between the insulating member 111 and the outer coating 102. The screening member 115 is formed by an extrusion molding of a semi-conductive material and covers the insulating member 111 to minimize an ionization generated from a surface of the insulating member 111 and ease the electric field formed in the cable 100. The screening member 115 is covered to extend to the inside of the wedge member 305 and eases the electric field formed in the plug means 300.

The plug means 300 covers a semi-conductive varnish 317 provided between the insulating member 111 and the wedge member 305, to the screening member 115 extending to the inside of the wedge member 305 to further ease the electric field formed in the plug means 300.

If the configuration for easing the electric field is provided, a ground wire 401 which includes a copper material is installed. The ground wire 401 is grounded to the earth by being connected to the screening member 115 exposed by removing the outer coating 102 of the cable 100 to be adjacent to the plug means 300. The ground wire 401 is fixed by a fixer 405 forming a looped curve when being closed after being open and surrounding the screening member 115. The fixer 405 is covered by a covering member 407 and shielded from the outside not to allow rainwater or moisture to percolate. The covering member 407 may include a heat-shrinkable tube including a synthetic material.

As shown in FIGS. 4 and 5, the outer coating 102 may cover the screening member 115 at a predetermined distance from the wedge member 305, and the cable 100 may include a conductive wire screening member 151 which is covered between the outer coating 102 and the screening member 115 and eases the electric field of the cable 100.

The wire screening member 151 is formed by arranging a plurality of copper wires along a circumference of the screening member 115. The wire screening member 151 passes through an end of the outer coating 102 and is bent and extends from the outer coating 102 and passes through the second housing 320. The wire screening member 151 which passes through the second housing 320 as above is connected to the earth and acts as a ground wire.

A part of the wire screening member 151 extending along the outer coating 102, i.e., the part located in the second housing 320 is preferably insulated by a first insulating tape 153.

The plug means 300 covers a first metal film 331 including a silver material from the screening member 115 between the outer coating 102 and the wedge member 305 to a part of the insulating member 111, and covers a first copper net 333, which is tinned, from the first metal film 331 between the outer coating 102 and the wedge member 305 to a part of the wire screening member 151 extending along the outer coating 102 to ease an electric field formed in the plug means 300. The first copper net 333 is preferably insulated by a second insulating tape 335.

As shown in FIGS. 6 and 7, the cable 100 may include a conductive shield member 123 which is covered between the screening member 115 and the outer coating 102. The shield member 123 is covered with respect to the screening member 115 to be spaced from the wedge member 305 at a predetermined interval. And end of the shield member 123 facing the wedge member 305 has an outer coating 102 removed and exposed to the outside to thereby ease the electric field formed in the plug means 300.

The shield member 123 is formed by an extrusion molding of aluminum, and is preferably shaped like a flexible pipe. The outer coating 102 includes a PE or PVC material to protect the shield member 123 from electric or chemical action. The outer coating 102 is covered in the form of a flexible pipe along the shield member 123.

The shield member 123 enables the cable 100 to be installed in highly moist place or in an environment having bad surface of duct.

The cable 100 may include a semi-conductive member 127 which is covered across the screening member 115. The semi-conductive member 127 includes semi-conductive polyethylene and is shaped like a tape to be wound to the screening member 115. The semi-conductive member 127 eases the electric field formed in the cable 100 and the plug means 300.

The plug means 300 covers a second metal film 361 having a silver material from the semi-conductive member 127 exposed from the shield member 123 to a part of the insulating member 111, and covers a second copper net 365 which is tinned from the second metal film 361 exposed between the wedge member 205 and the shield member 123 to a part of the wedge member 305 to ease the electric field formed in the plug means 300.

With the foregoing configuration, the ground wire 401 is connected to the ground by being connected to the shield member 123 exposed by removing the outer coating 102 of the cable 100.

Industrial Applicability

As described above, an apparatus for connecting connection parts between power apparatuses according to the present invention interconnects power apparatuses through a cable plug-in connection method to accomplish remarkable effects in the aspects of economical advantage, safety and ease of maintenance and recovery from failure, etc.

The invention claimed is:

1. An apparatus for connecting connection parts between power apparatuses comprising:
   a cable 100 which is constituted by a conductive wire 101, and an outer coating 102 which covers the conductive wire 101;
   socket means 200 which comprises a first housing 201, and a conductive connection element 203 which is arranged in the first housing 201 and has an insertion groove 203a, wherein the socket means 200 is installed in a power apparatus 1 to form a connection part for electrically connecting the cable 100 to the power apparatus 1; and plug means 300 which has a conductive ring 301 fitted to the conductive wire 101 exposed by removing the outer coating 102 from one end of the cable 100, and which is arranged at the cable 100 and fitted to the first housing 201 of the socket means 200 such that the conductive ring 301 is inserted into the insertion groove 203a of the conductive connection element 203 so as to electrically connect the cable 100 to the power apparatus 1;

the conductive ring 301 is fitted to a conductive tension member 303 fitted to the conductive wire 101 not to be separated from the conductive wire 101;

the tension member 303 has a tapered shape, and has long grooves formed along a circumference having a larger diameter to provide a tension; and a bushing 205 is further installed in an inner wall of the first housing 201.

2. The apparatus for connecting connection parts between power apparatuses according to claim 1, wherein a first sealing member 207 is further installed between the bushing 205 and the first housing 201 to provide water-tightness.

3. The apparatus for connecting connection parts between power apparatuses according to claim 1, wherein the plug means 300 further comprises an insulating wedge member 305 which is fitted to the conductive wire 101 in a rear side of the tension member 303 and connected to the bushing 205 of the socket means 200 to shut down an internal side thereof.

4. The apparatus for connecting connection parts between power apparatuses according to claim 3, wherein the wedge member 305 is formed to have an elasticity to provide tension between the wedge member 305 and the bushing 205 to prevent the conductive ring 301 from being separated from the insertion groove 203a of the conductive connection element 203.

5. The apparatus for connecting connection parts between power apparatuses according to claim 4, wherein the wedge member 305 comprises a non-inflammable synthetic rubber material or a non-inflammable insulating material.

6. The apparatus for connecting connection parts between power apparatuses according to claim 3, wherein a second housing 320 is further installed in a rear side of the wedge member 305 and coupled to the first housing 201 of the socket means 200 to be fitted to the cable 100 and fix the wedge member 305.

7. The apparatus for connecting connection parts between power apparatuses according to claim 6, wherein the first and second housings 201 and 320 are coupled to each other by screw threads with the surfaces facing each other.

8. The apparatus for connecting connection parts between power apparatuses according to claim 6, wherein a second sealing member 325 is further installed in the second housing 320 to provide water-tightness between the second housing 320 and the outer coating 102 of the cable 100.

9. The apparatus for connecting connection parts between power apparatuses according to claim 3, wherein the cable 100 further comprises an insulating member 111 which is covered between the conductive wire 101 and the outer coating 102, and the insulating member 111 is covered so that an end thereof protrudes from the wedge member 305.

10. The apparatus for connecting connection parts between power apparatuses according to claim 9, wherein the insulating member 111 is formed by an extrusion molding of cross-linked polyethylene.

11. The apparatus for connecting connection parts between power apparatuses according to claim 9, wherein the plug means 300 further comprises a conductive metal member 311 which is fitted to the conductive wire 101 between the tension member 303 and the wedge member 305, and a fitting groove 311a is further formed in the conductive metal member 311 to accommodate an end of the insulating member 111.

12. The apparatus for connecting connection parts between power apparatuses according to claim 11, wherein a semi-conductive screening member 113 is further covered between the insulating member 111 and the conductive wire 101 to minimize an electric stress of the conductive wire 101.

13. The apparatus for connecting connection parts between power apparatuses according to claim 12, wherein the conductive wire screening member 113 is formed by an extrusion molding of semi-conductive polyethylene.

14. The apparatus for connecting connection parts between power apparatuses according to claim 12, wherein the cable 100 further comprises a semi-conductive screening member 115 which is covered between the insulating member 111 and the outer coating 102 to minimize an ionization arising from a surface of the insulating member 111, and the screening member 115 is covered to extend to an inside of the wedge member 305.

15. The apparatus for connecting connection parts between power apparatuses according to claim 14, wherein the screening member 115 is formed by an extrusion molding of a semi-conductive material.

16. The apparatus for connecting connection parts between power apparatuses according to claim 14, wherein the outer coating 102 covers the screening member 115 at a predetermined distance from the wedge member 305, and the cable 100 further comprises a conductive wire screening member 151 which extends between the outer coating 102 and the screening member 115.

17. The apparatus for connecting connection parts between power apparatuses according to claim 16, wherein the wire screening member 151 is connected to the ground by passing through an end of the outer coating 102 and being bent and extending along the outer coating 102.

18. The apparatus for connecting connection parts between power apparatuses according to claim 17, wherein a part of the wire screening member 151 which extends along the outer coating 102 is insulated by a first insulating tape 153.

19. The apparatus for connecting connection parts between power apparatuses according to claim 17, wherein the wire screening member 151 is formed by arranging a plurality of copper wires along a circumference of the screening member 115.

20. The apparatus for connecting connection parts between power apparatuses according to claim 16, wherein the plug means 300 covers a first metal film 331 comprising a silver material from the screening member 115 between the outer coating 102 and the wedge member 305 to a part of the insulating member 111.

21. The apparatus for connecting connection parts between power apparatuses according to claim 20, wherein the plug means 300 further covers a first copper net 333, which is tinned, from the first metal film 331 between the outer coating 102 and the wedge member 305 to a part of the wire screening member 151 extending along the outer coating 102.

22. The apparatus for connecting connection parts between power apparatuses according to claim 21, wherein the first copper net 333 is insulated by a second insulating tape 335.

23. The apparatus for connecting connection parts between power apparatuses according to claim 14, wherein the cable 100 further comprises a conductive shield member 123 which is covered between the screening member 115 and the outer coating 102.

24. The apparatus for connecting connection parts between power apparatuses according to claim 23, wherein the shield member 123 is covered to be spaced from the wedge member 305 at a predetermined interval.

25. The apparatus for connecting connection parts between power apparatuses according to claim 24, wherein an end of the shield member 123 which faces the wedge member 305 is removed and exposed to the outside.

26. The apparatus for connecting connection parts between power apparatuses according to claim 23, wherein the shield member 123 comprises an aluminum material.

27. The apparatus for connecting connection parts between power apparatuses according to claim 23, wherein the shield member 123 is shaped like a flexible pipe.

28. The apparatus for connecting connection parts between power apparatuses according to claim 23, wherein the cable 100 further comprises a semi-conductive member 127 which is covered across the screening member 115.

29. The apparatus for connecting connection parts between power apparatuses according to claim 28, wherein the semi-conductive member 127 comprises semi-conductive polyethylene.

30. The apparatus for connecting connection parts between power apparatuses according to claim 28, wherein the semi-conductive member 127 is shaped like a tape and wound to the screening member 115.

31. The apparatus for connecting connection parts between power apparatuses according to claim 28, wherein the plug means 300 covers a second metal film 361, which comprises a silver material, from the semi-conductive member 127 exposed from the shield member 123 to a part of the insulating member 111.

32. The apparatus for connecting connection parts between power apparatuses according to claim 31, wherein the plug means 300 covers a second copper net 365, which is tinned, to the second metal film 361 between the wedge member 305 and the shield member 123.

33. The apparatus for connecting connection parts between power apparatuses according to claim 14, wherein the plug means 300 covers a semi-conductive varnish 317 between the insulating member 111 and the wedge member 305 to the screening member 115 extending to an inside of the wedge member 305.

34. The apparatus for connecting connection parts between power apparatuses according to claim 23, wherein a ground wire 401 is further installed in the cable 100 to be connected to one of the screening member 115 and the shield member 123.

35. The apparatus for connecting connection parts between power apparatuses according to claim 34, wherein the ground wire 401 is fixed by a fixer 405 which surrounds one of the screening member 115 and the shield member 123.

36. The apparatus for connecting connection parts between power apparatuses according to claim 35, wherein the fixer 405 is covered by a covering member 407 to be blocked from the outside.

37. The apparatus for connecting connection parts between power apparatuses according to claim 36, wherein the covering member 407 comprises a heat-shrinkable tube comprising a synthetic material.

38. The apparatus for connecting connection parts between power apparatuses according to claim 1, wherein the conductive wire 101 is formed by twisting a plurality of copper wires.

\* \* \* \* \*